(No Model.)
J. D. FYKE.
SASH PULLEY.
No. 318,890. Patented May 26, 1885.
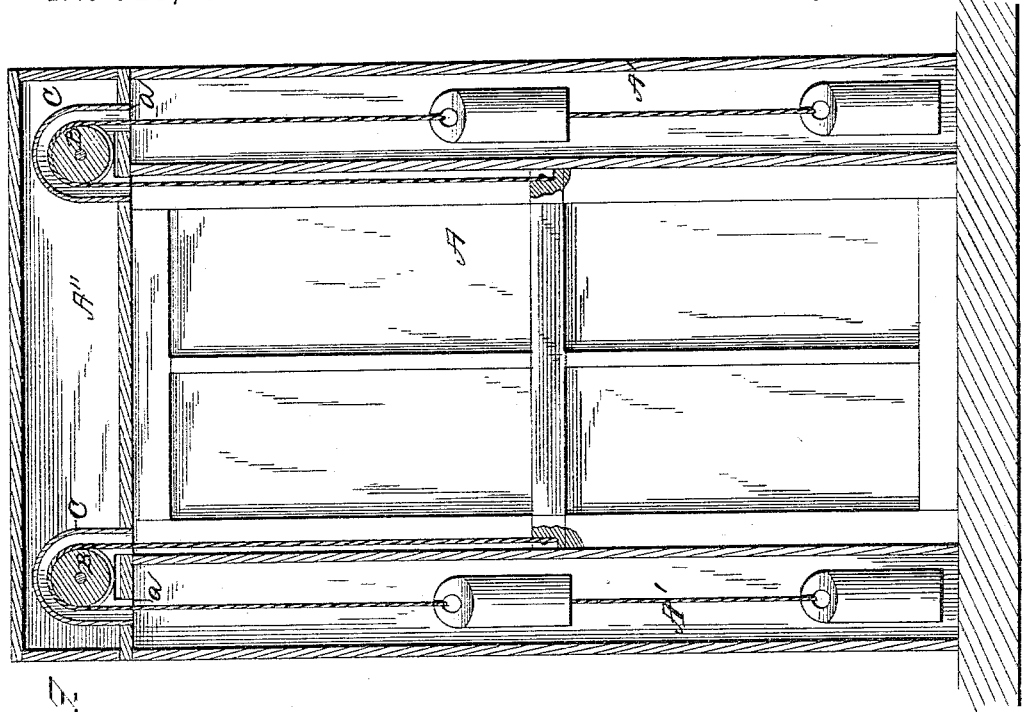
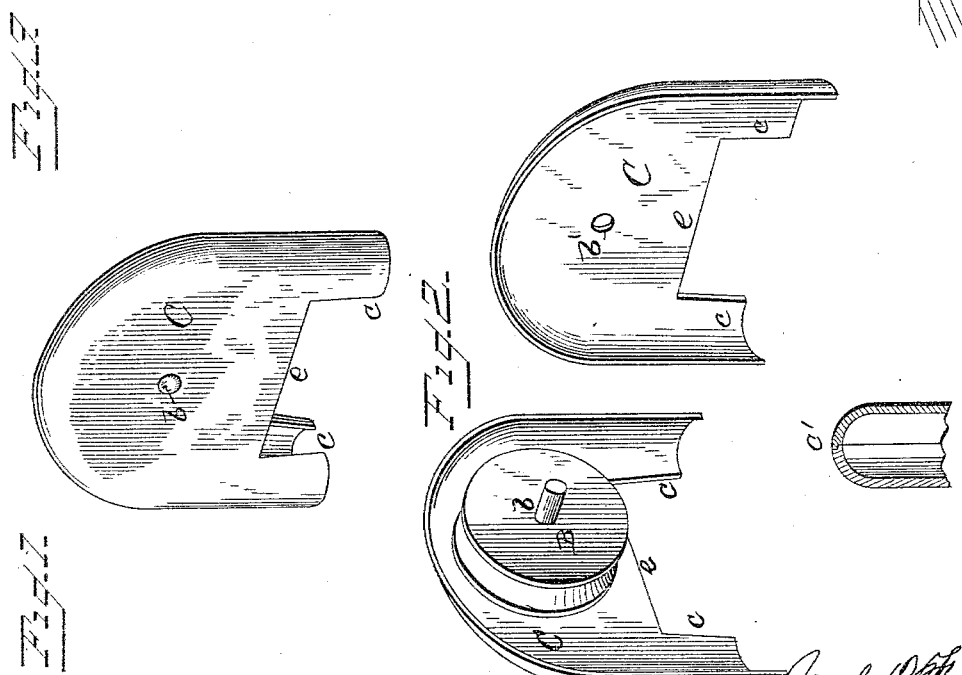
WITNESSES
Jacob D. Fyke
INVENTOR
Attorney

UNITED STATES PATENT OFFICE.

JACOB D. FYKE, OF LOS ANGELES, CALIFORNIA.

SASH-PULLEY.

SPECIFICATION forming part of Letters Patent No. 318,890, dated May 26, 1885.

Application filed February 12, 1885. (No model.)

*To all whom it may concern:*

Be it known that I, JACOB D. FYKE, a citizen of the United States of America, residing at Los Angeles, in the county of Los Angeles and State of California, have invented certain new and useful Improvements in Pulleys for Sash-Weights; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in pulleys for sash-cords; and it consists in two metallic casings of similar construction, which are attached to each other by a central rivet, which also serves as a bearing for the pulley, said casings being provided at their lower ends with projecting portions, which serve as supports to hold the casings and pulleys in position, as will be hereinafter fully set forth, and specifically pointed out in the claims.

In the accompanying drawings, which illustrate my invention, Figure 1 is a perspective view of my invention. Fig. 2 is a view showing the plates detached from each other, and Fig. 3 is a sectional view showing my invention applied.

A represents a window-frame, which is provided on each side with casings A', for the reception of the sash-weights, and above the same with a box, A'', within which are located the pulleys B.

C C represent two similarly-constructed casings, the upper ends of which are curved, as shown. These casings are provided at their lower ends with projecting portions c, which are bent so as to form the segment of a circle. The edges of the casings C C, where they abut against each other, are provided with an offset, c', which will prevent the parts slipping into or over each other; or, if desirable, the cover C, which incloses the pulley, may be made of but a single casting. The parts C C of the casing are held together by a transverse rivet, b, which passes through the perforations b', which are centrally located in the casings; and this rivet, besides forming a journal for the pulley B, also serves to hold the parts C C rigidly upon each other. The lower portion of the box A'' is provided with circular perforations a a, which are located immediately above the side rails of the sash and the casings A'. These circular openings are of the same size as the projecting portions c c of the casing C C, and when the projections upon said casings are placed therein the parts of the casing will be further held upon each other, as well as retained in a vertical position.

It will be seen from the foregoing that I not only provide a cheap and effective casing for the pulleys, but also provide a device which will prevent the cords from becoming displaced from said pulleys, and one which may be readily attached without the use of supplementary attaching means. The straight edge e at the lower edges of the casings will prevent said casings entering too far into the perforations a.

I claim—

1. The combination, in a sash-cord guide, of a casing, C, provided with projecting portions c and straight edges e, and a pulley located in said casing and supported upon a rivet, b, journaled in the sides of the casing, substantially as set forth.

2. In combination with the box A'', the bottom board of which is provided with circular perforations a a, located as shown, casings C, adapted to inclose a pulley which is journaled upon a central rivet, projecting portions c c, integral with the casing, adjacent to the straight edges e e, the parts being organized substantially as shown, and for the purpose set forth.

In testimony whereof I affix my signature in presence of two witnesses.

JACOB D. FYKE.

Witnesses:
 RALPH ROGERS,
 JAMES C. KAYS.